S. R. Thompson,
Pottery Machine.
No. 113,816. Patented Apr. 18, 1871.
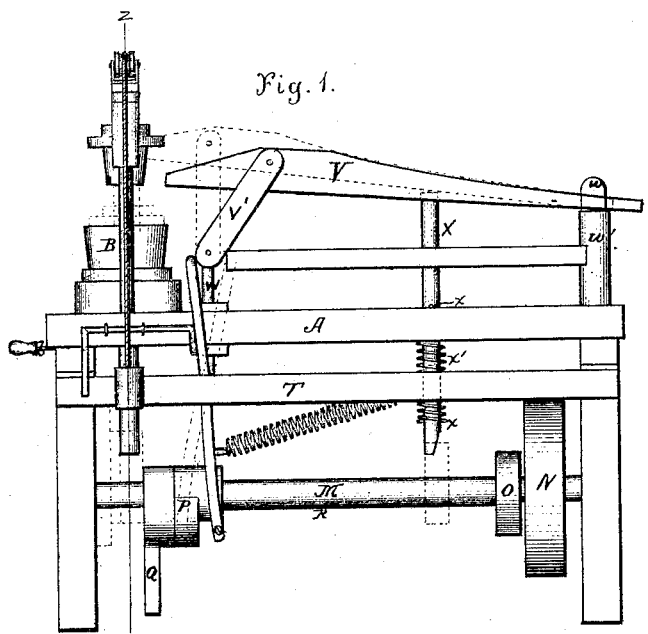
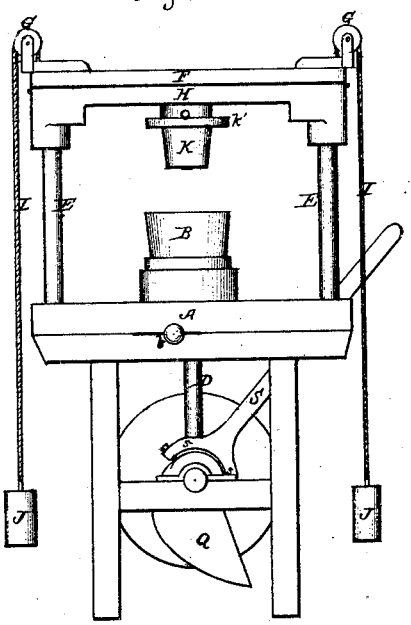
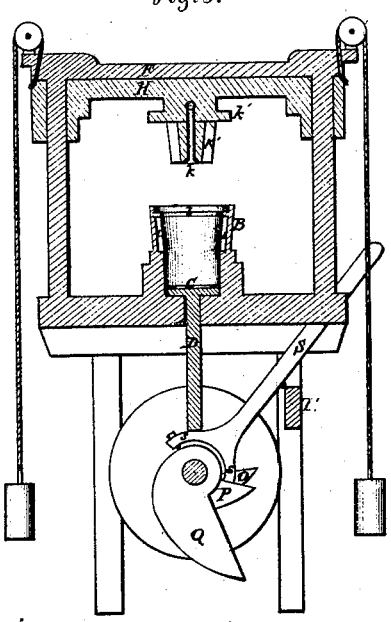
Witnesses,
Nath'l Brewer Jr
Aug. P. Baker
Inventor:
Saml. R. Thompson
by Carroll D. Wright & Brown.
Attys.

United States Patent Office.

SAMUEL R. THOMPSON, OF PORTSMOUTH, NEW HAMPSHIRE.

Letters Patent No. 113,816, dated April 18, 1871.

IMPROVEMENT IN MACHINES FOR MAKING POTTERY-WARE.

The Schedule referred to in these Letters Patent and making part of the same.

I, SAMUEL R. THOMPSON, of Portsmouth, in the county of Rockingham and State of New Hampshire, have invented certain Improvements in Machinery for Making Pottery and General Wares, of which the following is a specification.

Figure 1 is a side elevation of my invention;

Figure 2 is a front elevation of the same; and

Figure 3, a transverse vertical section through line $z\,z$, fig. 1.

This invention is an improvement on my patent of November 27, 1866; and

It consists mainly of a vertically-reciprocating core entering a mold from above, and a similar reciprocating plunger or piston entering said mold from beneath, together with a peculiar arrangement of cams and other details of construction whereby the parts are operated, all having for their object the facilitating of the manufacture of pottery-ware and the ready removal of the same from the machine, as will hereinafter more fully appear.

In the drawing—

A represents the frame of the machine, on one end of which is located the mold B, in the cavity of which rests a plunger or piston, C, which is provided with a rod, D.

On each side of mold B are standards E, which are connected at the top by cross-piece F, on which are located pulleys G.

On the standard E is located a carriage, H, which slides freely thereon vertically, and is attached by cords I I passing over pulleys G to weights J, and thereby held in the suspended position shown.

K represents a core attached to carriage H immediately above mold B, and shaped to conform to the interior of the latter. The core is provided with a valve, $k$, in an air-passage similar to that contained in my invention which was allowed June 3, 1870.

The surface of core K and the interior of mold B are provided with a coating of plaster, K' L, the same being protected and held in mold B by a metallic flange, $b$.

M represents a shaft located in suitable bearings in the lower portion of frame A, below the mold B, &c.

The shaft M is provided with a drive-wheel, N, and cams O P Q, the former of which is connected to the latter by a rod, R, all of said cams sliding freely on shaft M.

S represents a lever, bifurcated at its lower end, its bifurcations $s\,s$ being pivoted to the collar $p$ of cam P.

The lever S is hinged or pivoted near its center to the beam T of frame A, as shown in fig. 3.

U represents a spiral spring, one end of which is attached to the beam T and the other to the lower end of lever S, holding the same in the position shown.

V represents a swinging lever, pivoted near one end to a joint, V', which latter is pivoted to an adjustable standard, W, near mold B.

The opposite end of lever V rests between projecting guides $w$ on standard $w'$.

X represents a vertical rod passing through frame A, and having a vertical motion therein, which motion is limited by pins $x$ and spiral spring $x'$. The upper end of rod X bears against the lower side of lever V.

Operation.

The plastic material is placed in the cavity of the mold B in a suitable quantity, and rests on the piston or plunger C.

The carriage H is depressed, causing the core K, to enter the mold, leaving an annular space of the form of the vessel to be molded between the core and mold, said core being prevented from entering the mold too far by the projecting flange $k'$.

The carriage H is held in this position by the lever V, which is moved forward (as shown in dotted lines fig. 1) until its foremost end rests upon the upper side of carriage H.

The cams O, P, and Q are then moved by lever S along the shaft M, until the cam O is directly under rod X, when the cam P will occupy a corresponding position with relation to rod D.

The shaft M being revolved, the cam O, bearing against the rod X, forces the same upward, thereby raising the rear end of lever V and causing its opposite end to press downward on carriage H and hold the core K firmly in position. At the same time the cam P forces the rod D upward, thereby raising plunger C and crowding the plastic material thereon into the space between core K and mold B.

The cam P ceases to act on plunger C when the latter is within sufficient distance from the core to form the bottom of the vessel, the piston being held in this position by a spring, $b$, which engages with a notch in the side of rod D.

The cams O P are so arranged that the latter releases its rod a moment in advance of the former; consequently, after the vessel is molded the cam O releases rod X, which immediately falls and releases lever V, which resumes its former position and allows carriage H to rise, thus removing the core K from the mold, which core parts readily from the plastic material by reason of its air-passage and valve.

The newly-formed vessel now rests on the plunger C, which, as before mentioned, is held up by spring $b$. The cams O P Q are moved backward toward the wheel N by lever S until the cam Q is in position to engage with rod D, which cam, being greater in diameter than the others, forces the plunger C upward until its upper surface is flush with the upper edge of mold B, in which position it is held by spring $b$ as before, thus bringing the vessel into an accessible position, where it can be readily separated from plunger C by means of a wire or otherwise. The vessel being removed, the plunger C is caused to resume its former position by disengaging the spring $b$ from rod D.

The plaster covering or core K and lining of mold B enable me to dispense with the use of oil, which has heretofore been indispensable in molding by pressure, as the plastic material adheres to wooden or other molds, while it parts readily from plaster.

The mold B and core K can be removed from the machine, and others substituted, thus enabling the same mechanism to be used in the manufacture of different-sized or shaped vessels.

Having thus fully described my invention,

What I claim as new, and desire to secure by Letters Patent, is—

1. The carriage H, in combination with swinging lever V, rod X, and cam O, substantially as described.
2. The plunger C and rod D, in combination with cams P Q, substantially as described.
3. The core K and mold B, when provided with molding-surfaces K' L of plaster, substantially as described.
4. The arrangement of sliding cams O P Q with relation to rods X D, substantially as described.

In testimony whereof I have signed my name to this specification in the presence of two subscribing witnesses.

SAMUEL R. THOMPSON.

Witnesses:
CARROLL D. WRIGHT,
C. F. BROWN.